(12) United States Patent
Squibbs et al.

(10) Patent No.: US 7,020,468 B2
(45) Date of Patent: Mar. 28, 2006

(54) TASK-RELATED COMMUNICATION VIA WIRELESS COMMUNICATION HOTSPOTS

(75) Inventors: Robert Francis Squibbs, Bristol (GB); James Thomas Edward McDonnell, Malmesbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 340 days.

(21) Appl. No.: 10/354,551

(22) Filed: Jan. 29, 2003

(65) Prior Publication Data

US 2004/0198426 A1    Oct. 7, 2004

(30) Foreign Application Priority Data

Mar. 26, 2002  (GB)  .................................... 0207059

(51) Int. Cl.
*H04Q 7/20* (2006.01)

(52) U.S. Cl. ...................... 455/445; 455/428; 455/446; 455/404.2; 455/456.1; 455/456.3; 455/456.6

(58) Field of Classification Search ............. 455/422.1, 455/555, 423, 424, 425, 404.2, 453, 456.1, 455/456.2, 456.3, 428, 445, 446
See application file for complete search history.

(56) References Cited

U.S. PATENT DOCUMENTS 5,276,907 A * 1/1994 Meidan ...................... 455/436
5,990,928 A * 11/1999 Sklar et al. .................... 725/72

(Continued)

FOREIGN PATENT DOCUMENTS

| EP | 0 973 352 A2 | 1/2000 |
| GB | 2 366 688 A | 3/2002 |
| WO | 01/74110 A1 | 10/2001 |

OTHER PUBLICATIONS

Choi, S., et al., "Predictive and Adaptive Bandwidth Reservation for Handoffs in QoS-Sensitive Celluar Networks," INTERNET: <http://www.ececs.uc.edu/~edme/course/multi_hop_wireless.doc> pp 1-12 (May 10, 2000).

Iacono, A.L., et al., "Bounds on File Delivery Delay in an Infostations System," *Proceedings of the IEEE Vehicular Technology Conference, 2000*, INTERNET: <http://citeseer.nj.nec.com/308202.html>.

Imai, N., et al., "Prefetching Architecture for Hot-Spotted Network," *ICC 2001. Proceedings of International Conference on Communications, Helsinki, Finland, Jun. 11-14, 2001*, pp 2006-2010. INTERNET: <http://www.mlab.t.u-tokyo.ac.jp/publications/2001publications_j.html>.

Sharma, S., et al., "Implementation Experiences of Bandwidth Guarantee on a Wireless LAN," INTERNET: <http://citeseer.nj.nec.com/463957.html> (Jan. 2002).

Ye, T., et al., "Mobile awareness in a wide area wireless network of info-stations," *Mobile Computing and Networking*, INTERNET: <http://citeseer.nj.nec.com/ye98mobile.html> (Oct. 1998).

*Primary Examiner*—Sonny Trinh
*Assistant Examiner*—Huy Phan (57) ABSTRACT

A mobile device is used to effect task-related communication with a remote entity via the communications infrastructure of a wireless hotspot through which the mobile device is moving. The device includes a first estimation arrangement for estimating the time remaining before the mobile device leaves the coverage zone of the hotspot having regard to the predicted movement of the device. The device further includes a second estimation arrangement for estimating the time needed to complete the task-related communication. These two time estimates are compared with each other by a monitor unit of the device to determine whether there is sufficient time to complete the task-related communication.

10 Claims, 4 Drawing Sheets

U.S. PATENT DOCUMENTS

| | | |
|---|---|---|
| 6,188,905 B1 | 2/2001 | Rudrapatna et al. ........ 455/452 |
| 6,216,006 B1 * | 4/2001 | Scholefield et al. ........ 455/450 |
| 6,385,454 B1 | 5/2002 | Bahl et al. .................. 455/450 |
| 6,590,507 B1 * | 7/2003 | Burns .................... 340/995.13 |
| 6,597,906 B1 * | 7/2003 | Van Leeuwen et al. ..... 455/436 |
| 6,788,951 B1 * | 9/2004 | Aoki et al. .................. 455/524 |
| 6,868,331 B1 * | 3/2005 | Hanebrink .................. 701/117 |
| 2002/0058519 A1 * | 5/2002 | Nagahara .................... 455/456 |
| 2003/0007464 A1 * | 1/2003 | Balani ........................ 370/310 |
| 2004/0157622 A1 * | 8/2004 | Needham ................. 455/456.1 |

* cited by examiner

Figure 1

(PRIOR ART)

TASK-RELATED COMMUNICATION VIA WIRELESS COMMUNICATION HOTSPOTS

FIELD OF THE INVENTION

The present invention relates to task-related communication by a mobile entity with a remote entity using a wireless-based localized communication hotspot.

BACKGROUND OF THE INVENTION

Figure 1:
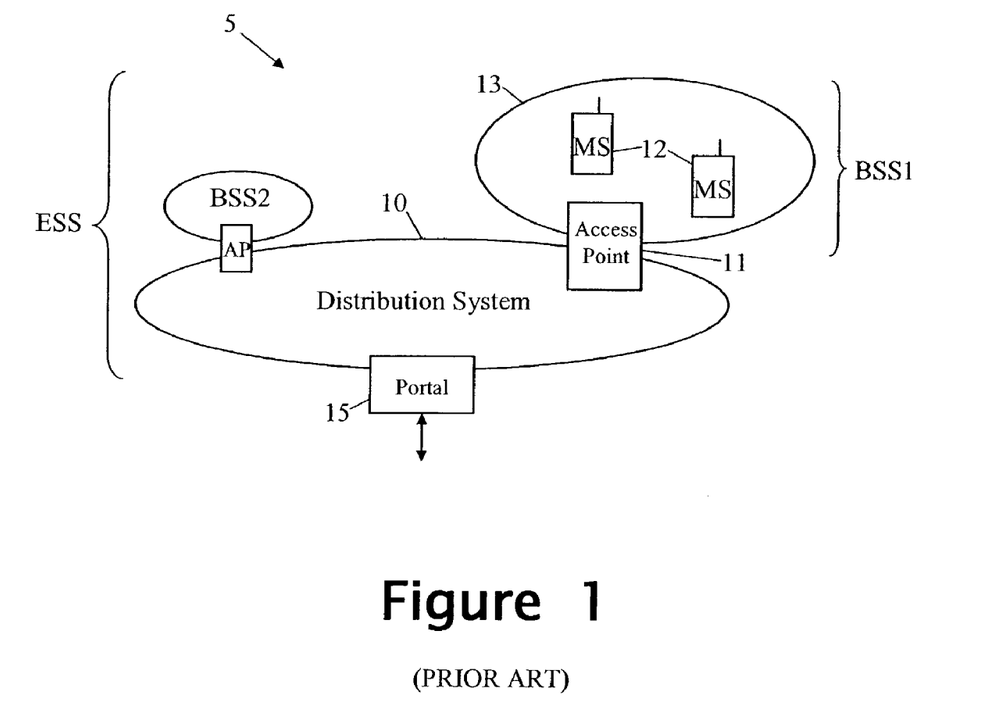
FIG. 1 is a diagram of a known wireless LAN architecture.

Wireless LANs are gaining substantial acceptance as a means for providing connectivity over a restricted area to mobile devices. Whilst there are a number of different wireless LAN architectures and the present invention is not limited to any particular one (or, indeed to wireless LANs), the following description is generally written using the terminology applied in the ANSI/IEEE Standard 802.11 ("Wireless LAN Medium Access Control and Physical Layer Specifications"). More particularly, FIG. 1 of the accompanying drawings illustrates the main components of a wireless LAN using that terminology. Thus, a typical wireless LAN 5 comprises a distribution system 10 that serves to interconnect a number of access points (AP) 11 via a network. Each access point 11 connects with mobile stations (MS) 12 over a wireless medium to form a Basic Service Set 13 (BSS1 and BSS2). The totality of the basis service sets and the network that interconnects them is called an Extended Service Set (ESS). The wireless LAN may connect with other networks via a portal 14.

Wireless LANs can be used to provide connectivity over limited areas such as public spaces and publicly-accessible premises, both commercial and non-commercial. These limited areas of connectivity are often referred to as "hotspots" as they generally provide a much higher speed of data transfer to mobile devices than is available via other wireless systems of more general coverage such as the data-capable bearer services provided by cellular radio networks such as GSM.

Whilst such connectivity "hotspots" are presently provided primarily by wireless LANs, other technologies can also be used to provide localised areas of high transfer rates (as compared to the surrounding environment) and as used herein the term "hotspot" is intended to be technology independent, merely indicating that improved data transfer rates are available in localised areas. An example of an alternative technology that can be used to provide a communications hotspot is a system that tracks the movement of a mobile device whilst within a limited range and uses a directional antenna pointing at the device to provide a high data rate link. Another example is the use of a cluster of infrared transceivers within a limited area, adjacent transceivers operating at different frequencies or with different modulations to avoid interference.

A significant drawback to the use of communication hotspots for effecting tasks that require a mobile device to communicate with a remote entity (such as file transfer) is that the mobile entity may move out of the coverage area of the hotspot before the task-related communication is completed.

SUMMARY OF THE INVENTION

According to one aspect of the present invention, there is provided a method of determining the completability by a mobile entity of task-related communication with a remote entity via a wireless-based localized communication hotspot; the method comprising the steps of:
 (a) predicting progress of the mobile entity;
 (b) during traversal of a hotspot by the mobile entity, determining the time available before the mobile entity leaves the hotspot based on its predicted progress and hotspot coverage information;
 (c) determining the time required until completion of said task-related communication;
 (d) comparing said time available and said time required, to determine whether the task-related communication is likely to be completed before the current hotspot is exited.

According to another aspect of the present invention, there is provided a service system for determining the completability by a mobile entity of task-related communication with a remote entity via a wireless-based localized communication hotspot; the system comprising:
 a communications subsystem for communicating with the mobile entity;
 a progress-prediction arrangement operative to predict progress of the mobile entity;
 a first time-estimation arrangement operative during traversal of a hotspot by the mobile entity, to determine the time available before the mobile entity leaves the hotspot based on its predicted progress and hotspot coverage information;
 a second time-estimation arrangement operative to determine the time required until completion of said task-related communication; and
 a comparison arrangement operative to compare said time available and said time required, to determine whether the task-related communication is likely to be completed before the current hotspot is exited.

According to a further aspect of the present invention, there is provided a mobile entity comprising:
 a task-execution subsystem for carrying out a task that requires communication with a remote entity;
 a communications subsystem for communicating with said remote entity via wireless-based localized communication hotspots; and
 a monitoring subsystem for determining the completability of the task-related communication by the mobile entity whilst in a current hotspot, the monitoring subsystem comprising:
  a progress-prediction arrangement operative to predict progress of the mobile entity;
  a first time-estimation arrangement operative during traversal of a hotspot by the mobile entity, to determine the time available before the mobile entity leaves the hotspot based on its predicted progress and hotspot coverage information;
  a second time-estimation arrangement operative to determine the time required until completion of said task-related communication; and
  a comparison arrangement operative to compare said time available and said time required, to determine whether the task-related communication is likely to be completed before the current hotspot is exited.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 2:
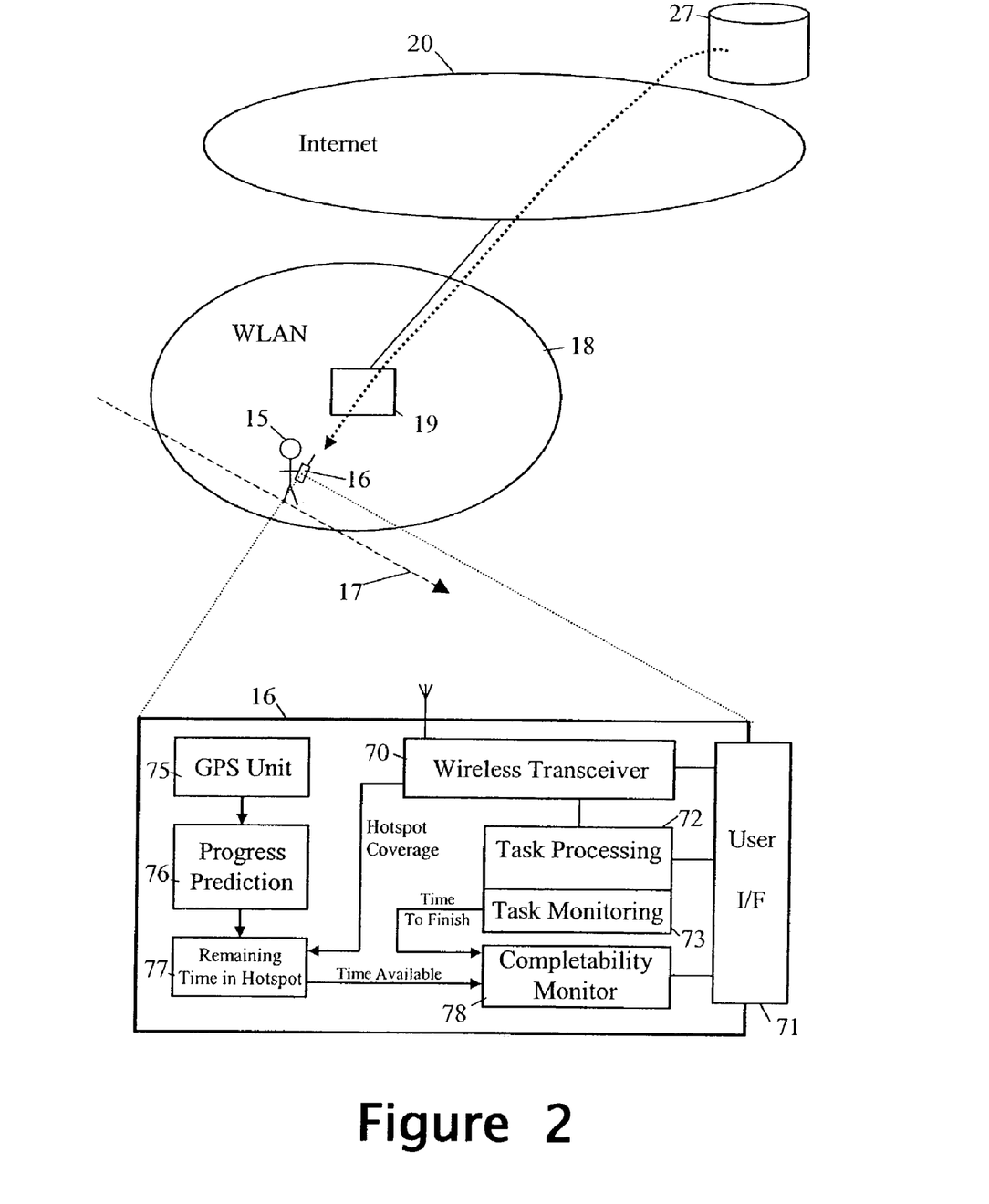
FIG. 2 is a diagram illustrating use of a handheld device embodying the invention for effecting task-related communication via a communication hotspot.

FIG. 2 shows a wireless communication hotspot 18 formed, for example, by a wireless LAN infrastructure 19 having a limited coverage area within which a suitably equipped and authorised mobile device 16—here depicted as a handheld device carried by pedestrian 15—can establish wireless communication with the infrastructure 19. The hotspot infrastructure 19 includes a portal providing connectivity to the public internet 20 (or other wide-area data network) and its connected resources 27 (typically, content sources and sinks). As a result, whilst the mobile device 16 remains within the hotspot 18 it can effect a task that requires communication with a remote entity such as the internet-connected resource 27; this task may, for example, be a file transfer requiring communication within the remote entity throughout the task, or a task where communication with the remote entity is only needed during part of the task (for example, to look up data required for processing being carried out by the task). In either case, completion of the task is dependent on completing the task-related communication with the remote entity. Since the mobile device 16 may be moving along a track 17 that will take it out of the coverage area of the hotspot, there is a risk that communication via the hotspot infrastructure will be lost before the task-related communication is completed. As will be more fully described below, the mobile device 16 is therefore arranged to determine the completability of the task-related communication having regard to the predicted progress of the mobile device through the hotspot 18.

Considering the mobile device 16 in more detail, as shown in FIG. 2 this device comprises a wireless transceiver 70 for establishing communicating with a remote entity via the hotspot infrastructure 19, a user interface subsystem 71 including general control functionality for controlling overall device operation, and a task-processing unit 72 for carrying out specific tasks, such as file transfer, as commanded by the control functionality of the user interface 71. Typically, the data processing operations (including control and task execution operations) are effected by a program-controlled processor according to standard practice.

The device 16 further comprises a first estimation arrangement operative when the device is within a hotspot, to estimate the time remaining before the device moves out of the hotspot coverage area. This arrangement comprises:

a GPS unit 75 for providing successive location fixes, a progress prediction unit 76 for predicting the future progress of the mobile device 16 on the basis of the previous track and speed of the device as derived from the location fixes provided by the GPS unit 75, and a unit 77 for determining the time available before the device leaves the hotspot based on its predicted progress and the coverage of the hotspot as indicated by coverage information received from the hotspot infrastructure 19 via the transceiver 70.

The location fixes, rather than being provided by a GPS unit, can be derived by any other suitable means such as from measurements made in respect of signals exchanged with a cellular radio network, or from local location beacons. The hotspot coverage information can also be differently provided such as, for example, either being stored in a memory of the device or received from a service system connected to the internet 20. As regards track prediction, rather than this being done simply on the basis of a straight line extrapolation of the previous track, real-world route constraints and the past history of tracks followed by the user 15 can be taken into account.

The device 16 further comprises a second estimation arrangement, in the form of task monitoring unit 72, for determining the time needed to complete the task-related communication associated with a task being run, or proposed to be run, by the task processing unit 72 (the estimate would include any non-communication part of the task needing to be effected in advance of the communication itself and, where the task has yet to be commenced, the time needed to start the task). Estimation of the time needed to carry out the task-related communication is arranged to take account of the connection speed (data transfer rate) available via the hotspot to the remote entity, the likely response time of the remote entity, and, of course, the nature of the task itself.

The available-time estimate produced by unit 77 and the completion-time estimate produced by unit 73 are passed to a completability monitor 78 where they are compared to determine whether the task-related communication is likely to be completed before the current hotspot is exited by the device. If the task-related communication is unlikely to be completed before the mobile device leaves the coverage area of the hotspot, an alert is output via user interface 71, this alert preferably including an indication of the discrepancy between the two time estimates. The user can now take appropriate action such as altering their route (or standing still) so as to extend the time in the hotspot to enable the task to be completed Alternatively or additionally to producing a user alert, the mobile device 16 can be arranged to effect one or more of the following:

generate route instructions for increasing the time remaining before the mobile entity leaves the hotspot (these instructions are then output to the user);

make a determination as to whether increasing the communication connection speed to an available higher rate is likely to result in completion of the task-related communication before the hotspot is exited and, if so, cause the connection speed to be so increased;

request the communications infrastructure of the hotspot to increase the coverage of the hotspot, at least along the predicted route of the mobile device (the hotspot infrastructure may have this capability, for example, as a result of being able to active extra access points at the periphery of the normal hotspot coverage area, or by boosting the power output and sensitivity of the existing access points);

transferring communication between the mobile device and the remote entity to a data-capable bearer service provided by a cellular radio infrastructure (this is preferably only done when the device is estimated to have a time remaining in the hotspot that is below a predetermined threshold and may also be subject to user consent).

It will be appreciated that the functionality provided at least by the first estimation arrangement 75–78 of the mobile device 16 could alternatively be provided by a service system with which the device is in communication either via the communication infrastructure of the hotspot or via another communication channel such as provided by a data-capable bearer service of a cellular radio network.

Figure 3:
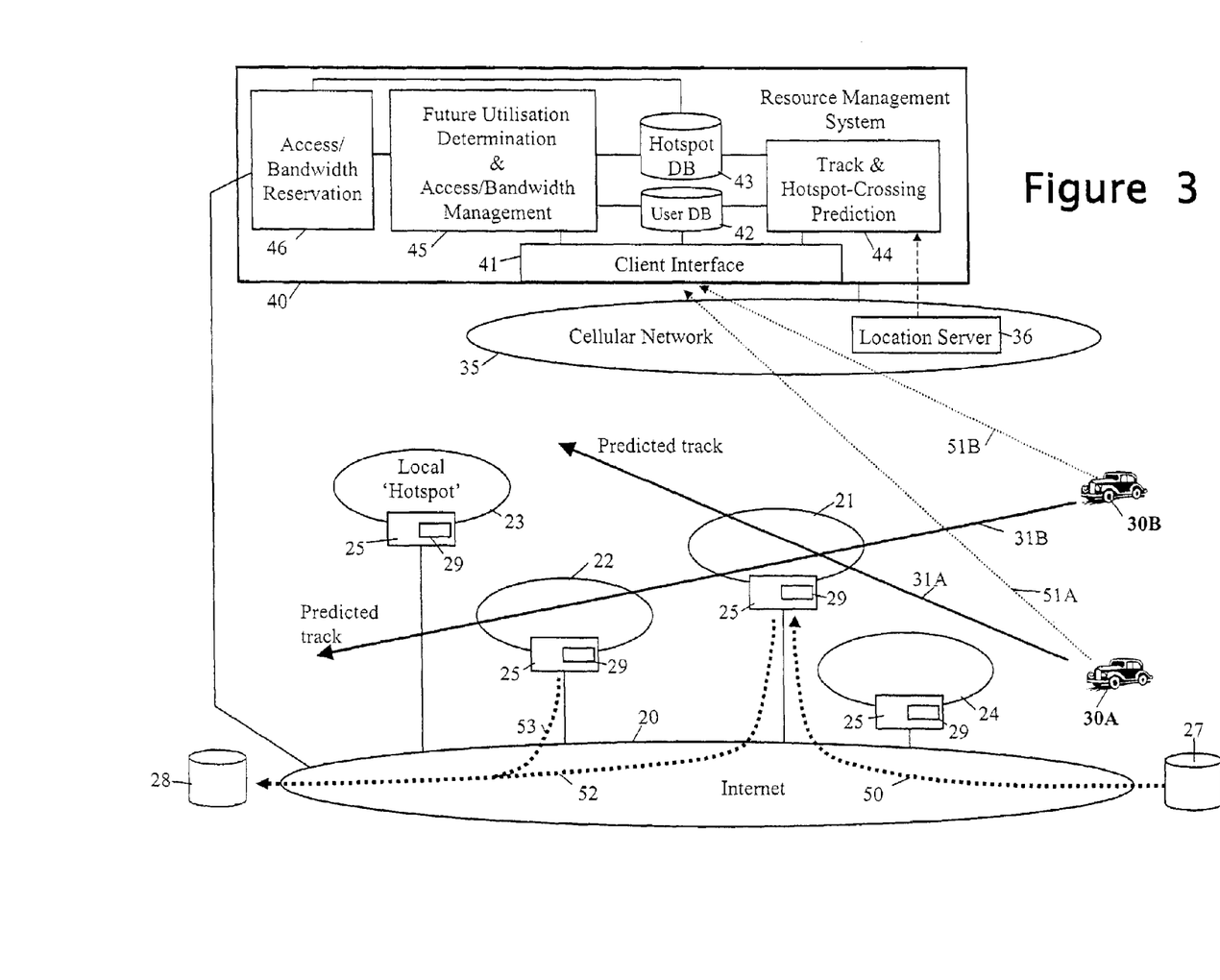
FIG. 3 is a diagram of a resource-management service system, embodying the invention, for determining future hotspot utilization needs of mobile devices and for managing communication resources accordingly.

FIG. 3 shows a second embodiment of the present invention in which a determination that a mobile device is likely to exit the coverage area of a hotspot prior to completion of task-related communication, results in action to manage communication resources of the mobile device and/or hotspot communication infrastructures. In FIG. 3 a plurality of wireless communication hotspots 21 to 24 each formed, for example, by a wireless LAN infrastructure 25 having a limited coverage area within which suitably equipped and authorised mobile devices 30A, 30B (here depicted as vehicle borne) can establish wireless communication with the infrastructure. Each hotspot infrastructure 25 includes a portal providing connectivity to the public internet 20 (or other wide-area data network) and its connected resources 27, 28 (typically, content sources and sinks); as a result, a mobile device 30A, 30B traversing a hotspot can connect to and exchange data with the internet-connected resources 27, 28.

In the present case each hotspot 21–24 is independently managed and its infrastructure 25 includes a control subsystem 29 with mechanisms, known per se, for restricting usage to authorised mobile devices. In the present embodiment, the control subsystem 29 of each hotspot also includes allocation mechanisms enabling a suitable-embodied mobile device to connect through to the internet at any selected one of several different data rates (connection speeds) with the resources needed for the selected data rate being made available on a guaranteed basis, at least so far as the resources of the hotspot infrastructure are concerned. In addition, in the present embodiment the control subsystem 29 further includes reservation mechanisms enabling hotspot resources for a particular data rate to be reserved in advance. For convenience, the allocation and reservation of the hotspot resources to provide for a particular data transfer rate, is referred to below as "bandwidth" allocation and reservation.

A resource-management service system 40 communicates with the hotspot infrastructures via the internet 20 (or any other appropriate channel) to set up hotspot access (usage) rights and/or reserve bandwidth (transfer data rate) for mobile devices that are registered users of the service system 40 and have a need to use the hotspot communication resources; in the present case, both mobile devices 30A and 30B are registered users.

In the present embodiment, the mobile devices 30A, 30B communicate with the service system 40 via a data-capable bearer service of a cellular radio network 35 such as a GSM based PLMN (Public Land Mobile Network) that provides ubiquitous coverage over an area encompassing all the hotspots 21–24.

The service system 40 is arranged to receive information about the movement of each registered mobile device 30A,B and of its data transfer needs. Based on predictions of what hotspots the mobile devices are likely to traverse, the service system 40 sets up hotspot access rights and/or reserves hotspot bandwidth in order to enable the mobile devices to effect the data transfers via the hotspots they traverse on their respective routes. The service system 40 can reserve hotspot access and bandwidth for a mobile device prior to the start of data transfer and whilst the device is outside any hotspot. The service system 40 can also determine that a current data transfer is unlikely to be completed during traversal of the hotspot in which the mobile device is currently located; in this case, the service system may either seek to increase the available bandwidth for the data transfer so as to complete it in the current hotspot, or set up access rights and/or reserve bandwidth for the mobile device in a next hotspot to be traversed by the device.

A more detailed description of the operation of the service system 40 is given below in respect of example data transfers undertaken by the mobile devices 30A,B.

Considering first mobile device 30A, it is assumed that this device has determined that it wishes to download a large content file from a content server 27—how this determination is made is not relevant for present purposes but may be as a result of browsing the internet via a data-capable bearer service of the cellular network or on the basis of a predetermined transfer schedule (for example, all new emails are to be downloaded together every hour). Upon determining that a large file is to be downloaded, the mobile device establishes communication with the service system 40 via the cellular network 35 where a client interface 41 first checks with user database 42 that the mobile device is (or belongs to) a registered user of the service system. Location fixes giving the location of the mobile device are then derived and passed to a track and hotspot-crossing prediction unit 44 of the service system, these location fixes being provided either directly from a location server 36 (that derives device location in standard manner from measurements taken by the cellular network infrastructure), or from the mobile device (the latter having received the location fixes, for example, from an associated GPS system or from the location server 36).

The prediction unit 44 uses the received location fixes to predict the progress of the mobile device 30A and, in particular, to predict its traversal of hotspots known to the service system; data about these hotspots, including geographical coverage data, is stored in database 43. Unit 44 can simply work on a straight-line extrapolation of the current direction of travel and speed of the mobile device (derived from successive location fixes) to determine the intersection of the predicted track of the device with hotspot coverage areas. Alternatively, more sophisticated approaches can be used taking account, for example, of route constraints such as would apply to vehicles (i.e. they must follow roads) where it is known or deduced that the mobile is vehicle borne. Use can also be made of histories of previous routes followed by the device (for example, user database 42 can store information about frequently followed routes and then seek to correlate the observed track of the mobile device 30A with such a route in order to predict the future track of the device). Of course, information on the route being followed can also be uploaded from the device to the service system.

For a mobile device 30 already in a hotspot, the prediction unit 44 is further arranged to be able to determine, on the basis of the predicted progress of the device and the geographic extent of the hotspot, the length of time that the device is likely to remain within the coverage of the hotspot.

In present example, upon unit 44 determining that the mobile device 30A is likely to traverse one or more hotspots, this information is passed via control functionality of the client interface 41 to a processing unit 45 together with information on the size of the file that the device wishes to download. Unit 45 also has access to information about the capabilities of the mobile device either directly from the device itself or from user database 42.

Figure 4:
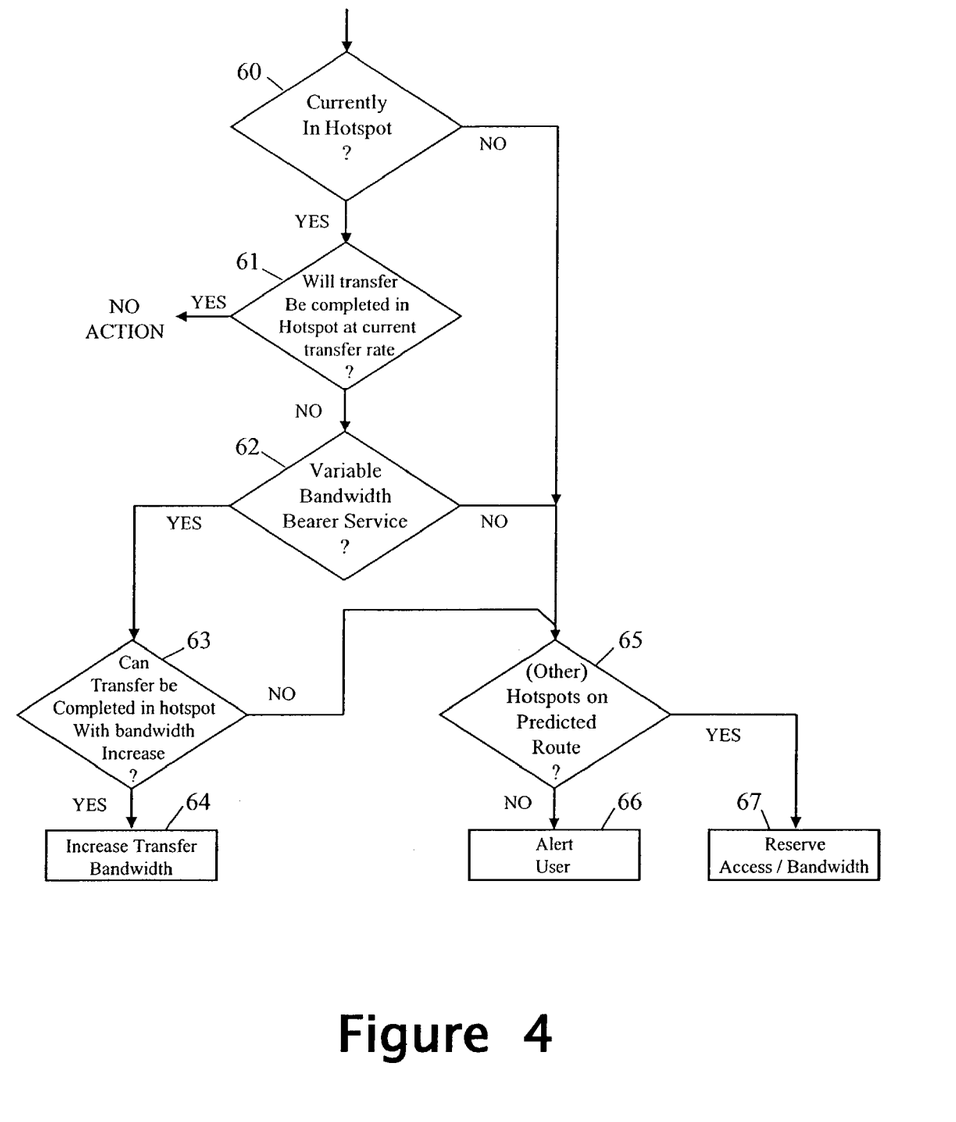
FIG. 4 is a flow chart showing a decision process carried out by the resource management service system of FIG. 3.

The processing unit 45 is operative then to make determinations about future utilisation of hotspot resources for satisfying the data transfer needs of the mobile device. FIG.

4 is a flow chart illustrating the general process carried out by the unit 45. More particularly, the unit 45 first determines whether the mobile device is currently in a hotspot and transferring data (block 60); if, as in the present example, this is not the case, the unit 45 checks the information it has received from unit 44 to see if the mobile device is likely to pass through a hotspot in the future (block 65). If the mobile device 30A is not predicted to pass through a hotspot, the unit 45 causes an alert to be sent to the mobile device 30A (block 66) to warn the device user of this to enable the latter to make a decision as to what alternative action to take (for example, to accept download of the file via a data-capable bearer service of the cellular network 35, the device having been set up with a default in which such an option is only permitted for files over a certain size with user permission, automatic download only being permitted via hotspots under the organisation of the service system 40).

Where unit 45 determines that the mobile device 30A is predicted to traverse at least one hotspot 21–24 along its route (in this case, hotspot 21—see predicted track 31A in FIG. 3), then unit 45 instructs (block 67) a reservation unit 46 to make appropriate access rights/bandwidth reservations with the relevant hotspot. In particular, unit 45 instructs unit 46 with information about the identity of the mobile device 30A, the (next) hotspot to be traversed by the device, the likely time of entry of the device into the hotspot, and the data transfer rate that is to be provided for (this latter being determined by the unit 45 on the basis of the capabilities of the device, the costs associated with various different transfer rates, and the amount of data to be transferred, it being appreciated that a significantly higher cost will generally be considered acceptable if the data transfer can be completed during the traversal of a single hotspot).

The reservation unit 46 is then responsible for contacting the control subsystem 29 of the relevant hotspot 21 to set up access rights for the mobile device 30A and to reserve resources to enable the device to connect to the internet at a particular data rate. This reservation is done on the basis of the predicted time of entry of the mobile device into the coverage area of the hotspot—entry within a small margin of that time guaranteeing that the resources are available immediately whereas entry at later or earlier times only guaranteeing that the resources will be available within a certain time delay.

When it has made the requested reservation, the unit 46 reports back to unit 45 and may also pass it an access pass-code specified by the hotspot control subsystem. The unit 46 then informs the mobile device 30A, via the client interface 41, of the hotspot access that has been set up and any pass-code to be used. If the unit 46 is unable to make the desired hotspot resource reservation, the unit is arranged either to negotiate the closest suitable reservation with the hotspot concerned, or else to reports back to the unit 45 which modifies its reservation requirements.

In due course, the mobile device 30A starts to traverse the hotspot 21 and in doing so seeks to gain access to the communication resources of the hotspot in order to establish communication with the content server 27 to effect the desired download. In the present example, it is assumed that the download is successfully established and completed during the traversal of hotspot 21 by the mobile device 30A.

It will be appreciated that track prediction is not necessarily done on a once-off basis and can, instead, be done repeatedly as each new location fix becomes available or at some other suitable frequency. In this case, the prediction of hotspot crossing and time of arrival at a hotspot can be successively refined and used by the units 45 and 46 to modify the access and bandwidth reservations made for the hotspot resources. In addition, the data transfer requirements of the mobile device may change with time and cause changes in the hotspot access and bandwidth reservations.

This updating of track prediction and data transfer needs can go on not only as the mobile device 30A progresses towards a hotspot, but also during the data transfer process once the mobile device has entered a hotspot coverage area and initiated a data transfer. In this case, as already mentioned above, the unit 44 is arranged to determine the time remaining in the hotspot based on predicted track. Now when the unit 45 runs the FIG. 4 process, since the device is within a hotspot and effecting a data transfer, it exits block 60 to block 61 where it determines whether, having regard to the remaining time in the hotspot for the device, there is sufficient time to complete the data transfer at the current data rate; if this is the case, no action is taken whereas if there is insufficient time to complete the transfer, the unit 45 goes on to check (block 62) whether a different (higher) data transfer rate (transfer bandwidth) can be set. If this is not the case, the unit 45 proceeds to block 65 where it checks to see if other hotspots are on the predicted track of the mobile device, as already described above. If, however, a higher data transfer rate can be set, then a determination is made as to whether this would result in completion of the data transfer and if this is so, action is taken to increase the data transfer rate whereas otherwise the unit proceeds to block 65.

Increasing the data transfer rate may be something that lies within control of the mobile device 30A without the need for the service system to contact the control subsystem 29 of the hotspot concerned (hotspot 21 in the present example); in this case, the service system simply advises the mobile device that it should go to a higher transfer rate and the device proceeds to do so in cooperation with the infra-structure of the hotspot. However, in order to achieve a higher data transfer rate, it may be necessary for the unit 45 to instruct the unit 46 to contact the control subsystem of the hotspot to set up the increased transfer rate.

As regards the mobile device 30B shown in FIG. 3, this mobile device is shown as having a predicted track 31B that takes it through two hotspots 21 and 22. In this example, it is assumed that the mobile device 30B wishes to upload a data file to a content sink 28 starting at a particular time. Either at this scheduled upload time or a short while beforehand, the mobile device contacts the service system to set up the transfer via the hotspots to be traversed by the device. The service system then carries out the steps already described to set up transfer via the hotspot 21. In due course, the mobile device enters the coverage area of hotspot 21 and initiates data upload. As the mobile device 30B traverses the hotspot, further determinations made by the service system as to the hotspot utilisation requirements of the device indicate that the data upload will not be completed during the current hotspot traversal, either at the current data transfer rate or at any available higher rate. The service system then proceeds to determine that the device is also likely to traverse hotspot 24 and accordingly makes access and bandwidth reservations with that hotspot for completion of the data transfer. If the hotspot control subsystem requires to know how much data is to be transferred, then the unit 45 makes a prediction based on the amount of data remaining to be transferred and the predicted time remaining in hotspot 21.

Rather than the unit 45 operating on the basis of only making reservations for one hotspot ahead of the current position of the mobile device, unit 45 can be arranged to reserve resources in all hotspots predicted to be traversed by the mobile device and needed to complete a particular data transfer. Thus, prior to the mobile device 30B entering hotspot 21, the unit 45 can be arranged to reserve access and bandwidth in both hotspots 21 and 24.

Where a data transfer is interrupted by a mobile device leaving a hotspot, then the endpoints of the transfer use any suitable mechanism enabling the transfer to be subsequently resumed at the point where it was interrupted; such mechanisms are currently widely used for internet downloads particularly for users using unreliable, low data rate, access connections.

It will be appreciated that many variants are possible to the FIG. 3 embodiment of the invention. For example, the reservation unit 46 can be arranged to make access and/or bandwidth reservations on the basis of the needs of all devices currently using the service system. Thus, access and bandwidth are not reserved for particular devices but as a whole for all registered devices. The reservations made are preferably not just an aggregate of the individual device needs but, instead, take account on a statistical basis of the actual usage needs likely to result from the predictions. Thus, access rights may be reserved for only 90% of the mobile devices predicted as likely to traverse a particular hotspot because statistically it had been found that only in exceptional circumstances did more than 90% of those devices actually do enter the hotspot with an unsatisfied data transfer need. It will be appreciated that such a statistical-weighting reservation mechanism preferably takes account of the likelihood of a device keeping to its predicted track and a simple measure that can be used in this case is the distance of the device from the hotspot—the greater the distance, the greater the possibility of the device changing direction and not traversing the hotspot. Thus, if all devices predicted as having a future utilization need for a hotspot are near to entering the hotspot, then the statistical-weighting reservation mechanism should reserve nearly 100% of the resources predicted as being needed; in contrast, where the mobile devices are all at some distance from the hotspot, then the statistical-weighting reservation mechanism can be arranged to reserve, for example, only 80% of the resources predicted as necessary.

Although in the FIG. 3 embodiment, the mobile devices use an ubiquitous communications system (for example, cellular network 35) to communicate with the service system, it is alternatively possible simply to use the connectivity provided by the hotspots assuming that the mobile devices have at least low data rate access rights to these hotspots for connecting through them to the service system 40. In this case, it can be useful to arrange for the content sources/sinks 27, 28 to inform the service system whenever a data transfer is interrupted before its completion, the service system then having a positive indication that the mobile device has exited a hotspot. It is alternatively possible to arrange for the hotspot control system itself to monitor data transfer progress and indicate to the service system when an incomplete transfer is interrupted.

Where a mobile device has connectivity to an ubiquitous communications service such as provided by a data-capable bearer service of a cellular radio network 35, then this service can be used to continue a data transfer between hotspots, the data transfer being handed over from a hotspot connection to the bearer service as the mobile device leaves the hotspot and being handed over again to the next hotspot connection when established.

The functionality of the service system (other than the predicted-utilization aggregation and statistical-weighting mechanisms mentioned above) can be incorporated into a mobile device so that the device itself takes care of reserving the resources it predicts that it will need in the future.

It will be appreciated that resource management can involve both, or only one of, obtaining hotspot access rights and reserving bandwidth—for example, all devices may already have access rights to the hotspots in which case only bandwidth reservation is called for. Conversely, a hotspot may not have any provision for allocating bandwidth and simply controls access; in this case, it is only required to obtain access rights to hotspots predicted to be traversed.

Although in both of the above-described embodiments the remote entity with which the mobile device 16/30 is in communication is an internet-connected resource, it is to be understood that the remote entity could be connected directly to the communications infrastructure of a hotspot or connected to any other communications system accessible via the hotspot(s).

What is claimed is:

1. A method of communication comprising:
   (a) predicting progress of a mobile entity;
   (b) during traversal of a wireless-based localized communication hotspot by the mobile entity, determining the time available before the mobile entity leaves the hotspot based on its predicted progress and hotspot coverage information;
   (c) determining the time required until completion by the mobile entity of a task-related communication;
   (d) comparing said time available and said time required, to determine whether the task-related communication is likely to be completed before the current hotspot is exited and upon determining that the task-related communication is unlikely to be completed before the current hotspot is exited, generating route instructions for increasing the time remaining before the mobile entity leaves the hotspot.

2. A method according to claim 1, wherein at least (b), (c) and (d) are carried out after commencement by the mobile entity of the task to which said task-related communication relates.

3. A method according to claim 1, wherein (a) to (d) are carried out prior to commencement by the mobile entity of the task to which said task-related communication relates.

4. A method according to claim 1, wherein said hotspot coverage information is received from communications infrastructure of the hotspot being traversed by the mobile entity.

5. A method according to claim 1, wherein at least (a) and (b) are carried out by a service system with which the mobile entity is in communication.

6. A method according to claim 1, wherein (a) to (d) are carried out by the mobile entity.

7. A method according to claim 1, wherein upon determining that the task-related communication is unlikely to be completed before the current hotspot is exited, a user alert is generated.

8. A method according to claim 1, wherein upon determining that the task-related communication is unlikely to be completed before the current hotspot is exited, a determination is made whether increasing the communication connection speed to an available higher rate is likely to result in completion of the task-related communication before the hotspot is exited and, if so, the connection speed is increased.

9. A method according to claim 1, wherein progress of the mobile entity is predicted on the basis of continually provided location data and, where available, pre-specified or previously-taken route data.

10. A mobile entity comprising:
   a task-execution subsystem for carrying out a task that requires communication with a remote entity;
   a communications subsystem for communicating with said remote entity via wireless-based localized communication hotspots;
   a monitoring subsystem for determining the completability of the task-related communication by the mobile entity whilst in a current hotspot, the monitoring subsystem comprising: a
       progress-prediction arrangement operative to predict progress of the mobile entity;
       a first time-estimation arrangement operative during traversal of a hotspot by the mobile entity, to determine the time available before the mobile entity leaves the hotspot based on its predicted progress and hotspot coverage information;
       a second time-estimation arrangement operative to determine the time required until completion of said task-related communication; and
       a comparison arrangement operative to compare said time available and said time required, to determine whether the task-related communication is likely to be completed before the current hotspot is exited; and
   a route-instruction generating arrangement arranged to respond to the comparison arrangement determining that the task-related communication is unlikely to be completed before the current hotspot is exited, by generating route instructions for increasing the time remaining before the mobile entity leaves the hotspot.

* * * * *